(12) United States Patent
Muehlschlegel

(10) Patent No.: US 9,705,316 B2
(45) Date of Patent: Jul. 11, 2017

(54) OVERVOLTAGE PROTECTION APPARATUS AND LUMINAIRE HAVING SUCH AN OVERVOLTAGE PROTECTION APPARATUS

(71) Applicant: OSRAM GmbH, Munich (DE)

(72) Inventor: Joachim Muehlschlegel, Groebenzell (DE)

(73) Assignee: OSRAM GMBH, Munich (DE)

( * ) Notice: Subject to any disclaimer, the term of this patent is extended or adjusted under 35 U.S.C. 154(b) by 80 days.

(21) Appl. No.: 14/989,819

(22) Filed: Jan. 7, 2016

(65) Prior Publication Data
US 2016/0204600 A1 Jul. 14, 2016

(30) Foreign Application Priority Data
Jan. 9, 2015 (DE) .................. 10 2015 200 186

(51) Int. Cl.
*H05B 33/08* (2006.01)
*H02H 9/04* (2006.01)
*H01H 83/10* (2006.01)
*H02H 9/06* (2006.01)

(52) U.S. Cl.
CPC ............ *H02H 9/04* (2013.01); *H01H 83/10* (2013.01); *H02H 9/043* (2013.01); *H02H 9/06* (2013.01); *H05B 33/089* (2013.01)

(58) Field of Classification Search
None
See application file for complete search history.

(56) References Cited

U.S. PATENT DOCUMENTS

| | | | |
|---|---|---|---|
| 8,531,811 B2* | 9/2013 | Ruess .................... | H02H 9/042 111/118 |
| 2004/0169982 A1 | 9/2004 | Bunton et al. | |
| 2010/0127625 A1* | 5/2010 | Minarczyk ........ | H05B 33/0887 315/119 |
| 2013/0044523 A1* | 2/2013 | Hsiao ...................... | H02H 9/04 363/52 |
| 2013/0170085 A1 | 7/2013 | Kim et al. | |

FOREIGN PATENT DOCUMENTS

DE 102010039437 A1 2/2012

OTHER PUBLICATIONS

German Search Report based on application No. 10 2015 200 186.5(8 pages) dated on Aug. 17, 2015 (for reference purpose only).

* cited by examiner

*Primary Examiner* — Jany Richardson
(74) *Attorney, Agent, or Firm* — Viering, Jentschura & Partner mbB

(57) ABSTRACT

An overvoltage protection apparatus may include a first connection for coupling to an N line, and at least one voltage-limiting element which is designed to block the current through the voltage-limiting element up to a predefinable threshold value of the voltage dropped across the voltage-limiting element and to conduct the current above this threshold value. The overvoltage protection apparatus may further include a second connection for coupling to a metal housing of an electrical apparatus, at least one capacitor, and at least one first non-reactive resistor. The at least one capacitor, the at least one first non-reactive resistor and the at least one voltage-limiting element are connected in series between the first connection and the second connection.

20 Claims, 3 Drawing Sheets

OVERVOLTAGE PROTECTION APPARATUS AND LUMINAIRE HAVING SUCH AN OVERVOLTAGE PROTECTION APPARATUS

CROSS-REFERENCE TO RELATED APPLICATION

This application claims priority to German Patent Application Serial No. 10 2015 200 186.5, which was filed Jan. 9, 2015, and is incorporated herein by reference in its entirety.

TECHNICAL FIELD

Various embodiments relate generally to an overvoltage protection apparatus having a first connection for coupling to an N line and at least one voltage-limiting element which is designed to block the current through the voltage-limiting element up to a predefinable threshold value of the voltage dropped across the voltage-limiting element and to conduct the current above this threshold value. Various embodiments also relate to a luminaire having a metal luminaire housing, a first luminaire connection for coupling to an N line or a ground conductor of the luminaire, a second luminaire connection for coupling to an L line and such an overvoltage protection apparatus.

BACKGROUND

Most asymmetrical brief overvoltage events outdoors, that is to say from the L conductor or N conductor to the ground potential, have a fairly high source impedance. The latter is usually between 50Ω and 1 kΩ As explained in more detail below, such events may result in the destruction of the LEDs of external luminaires which are equipped with the latter and have a metal housing, for example street lamps. Such undesirable events are caused, for example, by lightning strikes in the immediate surroundings of such external luminaires but also by lightning strikes in the clouds, in which case high voltage at the luminaire then primarily results from capacitive coupling. As a result of such a process, the luminaire housing may be charged up to several 10 kV, whereas the electronics of the luminaire remain at a low potential via their coupling to the L or N conductor.

If no protective measures are taken for external luminaires in this case, a short high-impedance voltage pulse can easily destroy the LEDs (light emitting diodes) of such an external luminaire since the voltages occurring in this case are very high. These voltages are between 40 kV and 6 kV starting from the strike point to a radius of 300 m around the strike point. These voltages also occur in that form in the LED module of an external luminaire equipped with the latter. A discharge resistance of a few MΩ, for example, which is provided for safety between the housing and ground potential does not suffice to protect against such events.

A conventional overvoltage protection apparatus 10 (SPD—Surge Protection Device) is illustrated in FIG. 1. This has proved successful in street luminaires having a tested PE (Protection Earth) connection. In this case, "protection class I" means that the metal luminaire housing 12 is connected to a tested PE. This overvoltage protection apparatus 10 uses the series circuit including a first and a second varistor V1, V2 between the N conductor and the L conductor, the coupling point of the two varistors V1, V2 being connected to the luminaire housing 12 and therefore to the PE via a spark gap FS1. The two varistors are usually dimensioned in such a manner that they become conductive at 500 V. The spark gap FS1 has a breakdown voltage of between 500 V and 5 kV, the operating voltage being approximately 40 V after a breakdown.

Reliable or tested PEs are unfortunately not always available for external or street lighting, e.g. are available, above all, only in cities. Therefore, a reliable or tested PE, which would be sufficient for protection class I, often does not exist for conventional street lighting.

Therefore, luminaires which have a protection concept according to protection class II are normally used in external or street lighting.

In this case, the overvoltage protection apparatus 10 illustrated in FIG. 1 is not permissible since the metal luminaire housing would have to be connected to the connection point PE here in order to achieve overvoltage protection which is not connected to a reliable PE, however.

Therefore, luminaires in which the luminaire housing is reliably connected to PE are luminaires of protection class I.

Electrical devices, and therefore also luminaires, of protection class II can be identified by the fact that they can be operated using a standardized two-pin Euro plug, that is to say without a PE connection. Such devices have a plastic housing, in which case double/reinforced insulation must be ensured between the mains potential and the housing. The test voltage of such devices is 3 kV AC. The air gaps must be ≥3 mm and the leakage paths must likewise be ≥3 mm.

If discharge lamps are used in external luminaires of protection class I, as previously conventional, the discharge lamps can be operated without a heat sink in the lamps. They are mounted only with the greatest possible distances from the lamp housing since convection is sufficient for heat dissipation in discharge lamps. This is because discharge lamps still operate without major impairment even at a temperature of 300° C.

However, if such external luminaires are equipped with LEDs, it should be taken into account that the efficiency of the LEDs is almost halved, and is considerably reduced in any case, given a temperature increase from 30° C. to 60° C., for example. For this reason, LEDs are usually mounted on a heat sink which is in turn coupled to the luminaire housing for heat dissipation. In order to avoid impairing the heat dissipation too much, a thin insulating layer is provided if necessary between the circuit board material of the LED and the heat sink, for example. However, the distances resulting in this case are not large enough to prevent a flashover of the above-mentioned high voltages occurring as a result of lightning strikes on the lamp housing if it is taken into account that the electronics of the luminaire are still at N potential. A lightning strike in the immediate surroundings of the external luminaire therefore often results in the destruction of the lamp electronics, e.g. the LEDs.

Overvoltage protection would also be desirable for other devices of protection class II, for example devices for controlling traffic flow or other devices for external applications.

SUMMARY

An overvoltage protection apparatus may include a first connection for coupling to an N line, and at least one voltage-limiting element which is designed to block the current through the voltage-limiting element up to a predefinable threshold value of the voltage dropped across the voltage-limiting element and to conduct the current above this threshold value. The overvoltage protection apparatus may further include a second connection for coupling to a metal housing of an electrical apparatus, at least one capacitor, and at least one first non-reactive resistor. The at least one capacitor, the at least one first non-reactive resistor and the at least one voltage-limiting element are connected in series between the first connection and the second connection.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows a schematic illustration of an embodiment of an overvoltage protection apparatus of protection class II according to various embodiments; and.

DESCRIPTION

Figure 1:
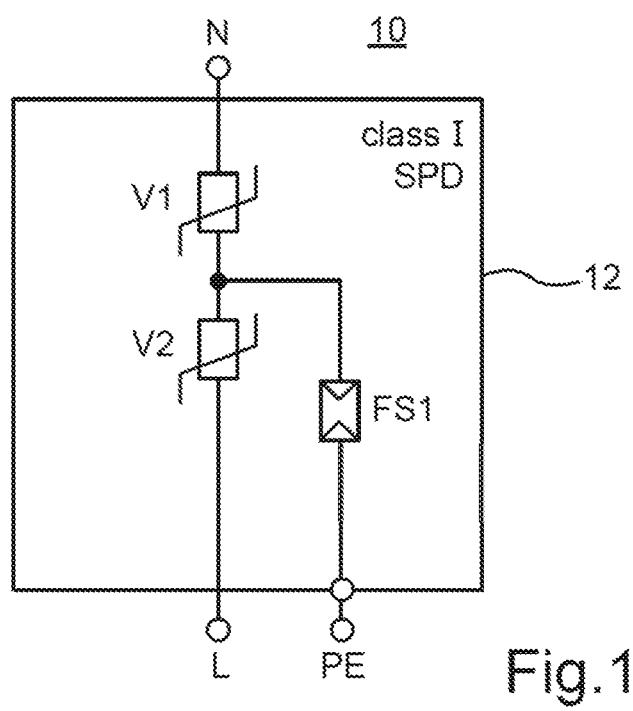
FIG. 1 shows a schematic illustration of a conventional overvoltage protection apparatus of protection class I.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments develop an overvoltage protection apparatus of the generic type in such a manner that it is possible to ensure reliable protection for devices, e.g. luminaires, having a metal housing even without the presence of a reliable or tested PE conductor. In this context, the apparatus is also intended to provide protection in the event of a first fault. Various embodiments also accordingly develop a luminaire of the generic type.

Various embodiments are initially based on the knowledge that the 60598-1 IEC 2008 standard should be taken into account for implementing an overvoltage protection apparatus according to various embodiments, according to which standard only particular safety components are allowed for the purpose of bridging double/reinforced insulation. These components include only so-called Y capacitors and special safety resistors which reliably limit the leakage current to the human body to very small values (<0.7 mA). They usually have resistance values of ≥1 MΩ. In various embodiments, it should be pointed out that a spark gap is not allowed for bridging double/reinforced insulation. A spark gap would be allowed only if it is connected to a metal housing which is connected to a reliable ground conductor or PE.

However, these components are used for other purposes in the prior art: Y capacitors are used for interference suppression, that is to say they eliminate undesirable high-frequency signals; safety resistors are used to discharge electrostatic charge through clouds. Furthermore, the knowledge that the ground resistance of PE to the local ground connection, for example the pole foot of a street luminaire, is between 50Ω and 200Ω in existing TT (Terra-Terra) networks and similar installations, e.g. 230 V installations without a PE line, should be taken into account. Such a ground resistance of 10Ω is recommended for new installations, but this value is usually already increased to 20Ω within a few weeks and is even increased to even higher values within further weeks.

The overvoltage protection apparatus according to various embodiments uses this ground resistance, in which case it is dimensioned for the recommended minimum value. The overvoltage protection apparatus according to various embodiments becomes even more effective with a ground resistance which increases over time. Internal measures by the driver apparatus for the LEDs can ensure, for example by using a capacitive voltage divider, that overvoltages at the luminaire housing of ≤6 kV do not cause any damage. The specified object is therefore, for example, to provide an overvoltage protection apparatus which reduces a voltage at the luminaire housing from 10 kV to at least 6 kV while taking into account the ground resistance of at least 10Ω.

According to various embodiments, an overvoltage protection apparatus of the generic type therefore may further include a second connection for coupling to a metal housing of an electrical apparatus, at least one capacitor, and at least one first non-reactive resistor, the at least one capacitor, the at least one first non-reactive resistor and the at least one voltage-limiting element being connected in series between the first connection and the second connection.

Therefore, with a suitable design, the at least one capacitor establishes the desired safety by providing a sufficient energy store for receiving the short energy pulse produced by a lightning strike and therefore preventing a breakdown of the housing potential to the N potential. This takes into account the fact that a lightning overvoltage rises to a maximum potential at the luminaire of 10 kV, for example, in approximately 1 µs and falls to 0 kV again within approximately 50 µs. The voltage-limiting element provides protection in the event of a first fault. If the N conductor is interchanged with the L conductor, the capacitor alone could possibly not establish the safety since said capacitor should be selected to be so large that the alternating current which flows across it would be >0.7 mA in the event of a first fault, as a result of which the maximum allowed leakage current to the human body would be exceeded.

The at least one capacitor may include a series circuit including two, three or four capacitors. Since each capacitor has a particular capacitance and a particular pulse dielectric strength, a desired total capacitance and a desired total pulse dielectric strength can be achieved by means of such a series circuit.

The capacitor may be in the form of a Y capacitor, e.g. a radio interference suppression capacitor of class Y1 or Y2, and/or has a total capacitance of 0.010 µF to 10 µF, e.g. 0.1 µF to 1 µF. As already mentioned, double insulation needs to be bridged during use as an overvoltage protection apparatus of class II. Since a Y2 capacitor can only bridge one insulation, a series circuit having two Y2 capacitors needs to be provided when using Y2 capacitors. A Y1 capacitor would be suitable, in principle, for bridging double insulation, but Y1 capacitors are not available in the required size.

Therefore, a plurality of capacitors need to be connected in parallel when using Y1 capacitors.

The at least one first non-reactive resistor is used to limit and attenuate the current through the at least one capacitor if the ground resistance is (still) too small.

The voltage-limiting element may include, for example, at least one spark gap, a gas discharge tube, a varistor and/or a limiting diode. In this context, it should be borne in mind that a spark gap alone, for example, according to the above-mentioned standard could not be used to implement an overvoltage protection apparatus for protection class II but could be used in series with at least one capacitor, as is the case according to various embodiments, since, as already mentioned above, the at least one capacitor establishes the required safety.

The overvoltage protection apparatus may further include a second non-reactive resistor which is connected in parallel with the at least one capacitor. This second non-reactive resistor is in the form of a safety resistor and is used to discharge the at least one capacitor and for discharging in the event of a potential electrostatic overvoltage. Its resistance value is between 0.3 MΩ and 10 MΩ, e.g. between 1 MΩ and 4 MΩ. In contrast, the first non-reactive resistor may be between 5Ω and 40Ω, e.g. 10Ω.

The first non-reactive resistor may be in the form of a varistor or an MOV (metal oxide varistor) or a VDR (voltage dependent resistor). In this manner, the flow of current through the at least one capacitor can be limited in a particularly reliable manner, on the one hand, and such components are suitable, on the other hand, for reliably conducting the high currents occurring in this case.

The overvoltage protection apparatus may further include an air spark gap which is connected in parallel with the capacitor. This is used to limit the voltage at the at least one capacitor in the case of rare, very high-energy surge pulses by virtue of the air spark gap flashing over. The air spark gap can be implemented by virtue of the fact that the circuit board has, in the layout of the copper tracks, an air gap, for example a gap in the copper and in the circuit board material, which is used as an air spark gap. Since only high-value safety resistors or Y capacitors or the insulation itself are currently allowed in the above-mentioned standard when bridging double insulation, an air spark gap can comply with the requirements from the standard for the insulation, but can enable a flashover for the smallest possible voltage by excessively increasing the field strength. Since it is connected in parallel with the insulation and with the Y capacitor, the structure of such an air spark gap must therefore conform to the standard. According to said standard, the necessary air gap for an RMS operating voltage of 250 V is ≥3 mm. This is therefore also an exemplary value for an embodiment of an overvoltage protection apparatus according to various embodiments. In any case, for other future standards, the field strength of the air spark gap should be dimensioned in such a manner that the voltage at the capacitor is limited to a value of between 5 kV and 15 kV, e.g. between 5 kV and 9 kV. Generally, the air gap of the air spark gap may be 3 mm to 6 mm, e.g. 3.0 mm to 3.2 mm.

The voltage-limiting element may be designed to limit the voltage to a value of between 500 V and 6 kV, e.g. to a value of between 500 V and 2.5 kV. Two properties are important in this case: on the one hand, the voltage-limiting element is intended to limit the current up to a predefinable threshold voltage of the voltage dropped across the voltage-limiting element; a leakage current of <0.7 mA is required when the lamp housing is touched. On the other hand, the voltage-limiting element is intended to conduct the current above the threshold value of the voltage dropped across the voltage-limiting element. In this case, the voltage-limiting element must be designed to conduct a current having a current intensity of between 500 A and 15,000 A. The voltage-limiting element is also used to block an alternating current in the event of a simple fault, for example if the connections for the N and L conductors are interchanged. Without this measure, the current flowing away in this case would be above the permitted limit of 0.7 mA.

In this context, a spark gap, a gas discharge tube, a varistor and/or a limiting diode, for example, come(s) into consideration for the voltage-limiting element, as already stated.

The overvoltage protection apparatus may also have a third non-reactive resistor which is connected in parallel with the voltage-limiting element. This third non-reactive resistor is again in the form of a safety resistor, in which case its resistance value is between 0.5 MΩ and 6 MΩ, e.g. between 1 MΩ and 2 MΩ. The third non-reactive resistor is used to discharge an electrostatic overvoltage.

A luminaire according to various embodiments may be distinguished by the fact that the first connection of the overvoltage protection apparatus is coupled to the first luminaire connection, and the second connection of the overvoltage protection apparatus is coupled to the metal luminaire housing and/or to a ground conductor of the luminaire. Reliable protection against a lightning strike can also be provided by using an overvoltage protection apparatus according to various embodiments without a tested PE conductor being routed to the luminaire. The ground conductor of the luminaire may be connected to PE, PEN (PE and N routed in one conductor), functional ground or the local grounding of the luminaire. This is not important for the method of operation of the overvoltage protection apparatus according to various embodiments.

The luminaire may include at least one LED as luminous means.

Figure 2:
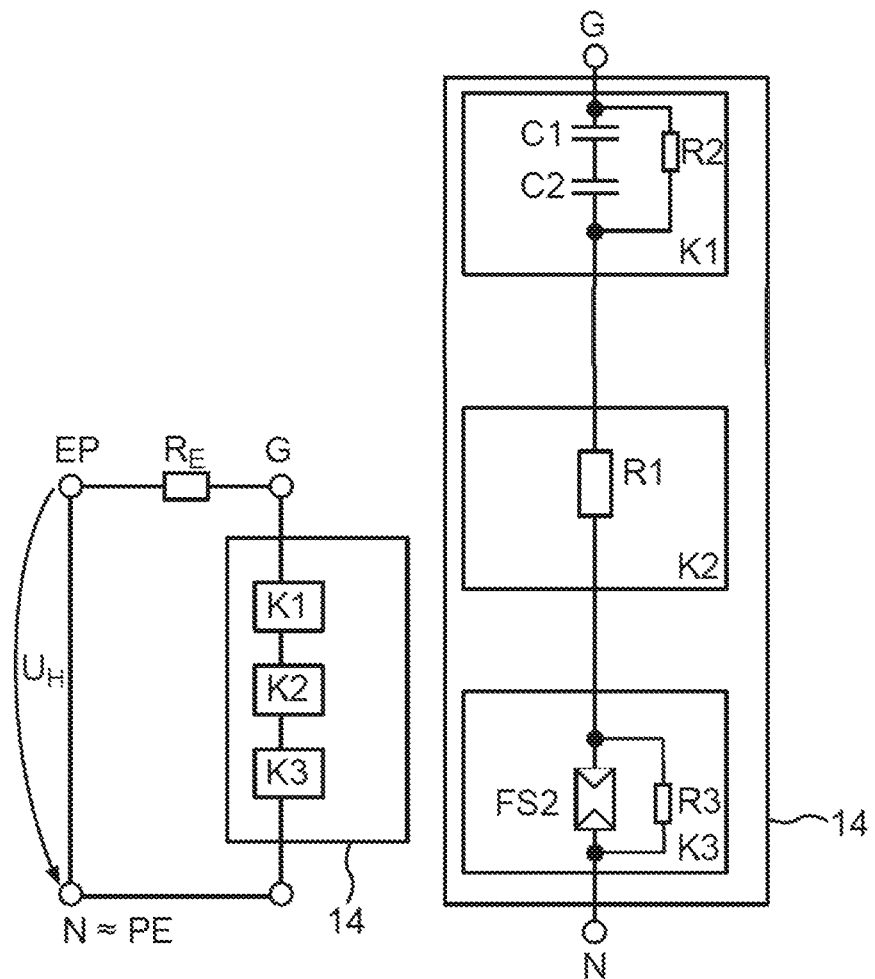

FIG. 2 shows a schematic illustration of an embodiment of an overvoltage protection apparatus 14 according to various embodiments. As can be gathered from the left-hand part of the illustration, the overvoltage protection apparatus 14 is coupled between two connections, namely a connection for an N line and, via a ground resistor $R_E$, a connection G for coupling to the metal housing of an electrical apparatus. The connection G is coupled to the remote ground potential EP via a ground resistor $R_E$. Depending on the distance from the strike point of lightning, a high voltage $U_H$, which may be between 40 kV and 6 kV, is dropped between the ground potential EP and the connection N which is substantially at the potential of protective ground PE. The ground resistance $R_E$ is between 10Ω and 200Ω. In this case, the ground resistance $R_E$ is composed of the resistance of the earth (through the loose grounding of the base of the street lighting) and the line resistance of the connection lines of the street lamp.

An overvoltage protection apparatus 14 according to various embodiments includes the series circuit having three blocks denoted K1, K2, K3, in which case their arrangement inside the series circuit may be arbitrary. The right-hand illustration in FIG. 2 shows implementation examples for the blocks K1, K2 and K3. Block K1 therefore includes the series circuit having two capacitors C1 and C2, a non-reactive resistor R2 being connected in parallel with this series circuit. The two capacitors C1 and C2 are in the form of Y capacitors of class Y2 and have a capacitance of 0.5 μF and a dielectric strength of 5 kV. The non-reactive resistor R2 is 2 MΩ.

Block K2 includes a non-reactive resistor R1 which is 10Ω. Block K3 contains the parallel circuit of a voltage-limiting element, which is in the form of a spark gap FS2 in the present case, and a non-reactive resistor R3. The spark gap FS2 has a breakdown voltage of 500 V; the non-reactive resistor R3 has a resistance value of 2 MΩ. Such dimensioning of the spark gap FS2 achieves protection against a simple fault, that is to say interchanging of the N and L conductors or an interruption in the N conductor, since a mains voltage of 230 V is then blocked by the spark gap, for example.

Figure 3:
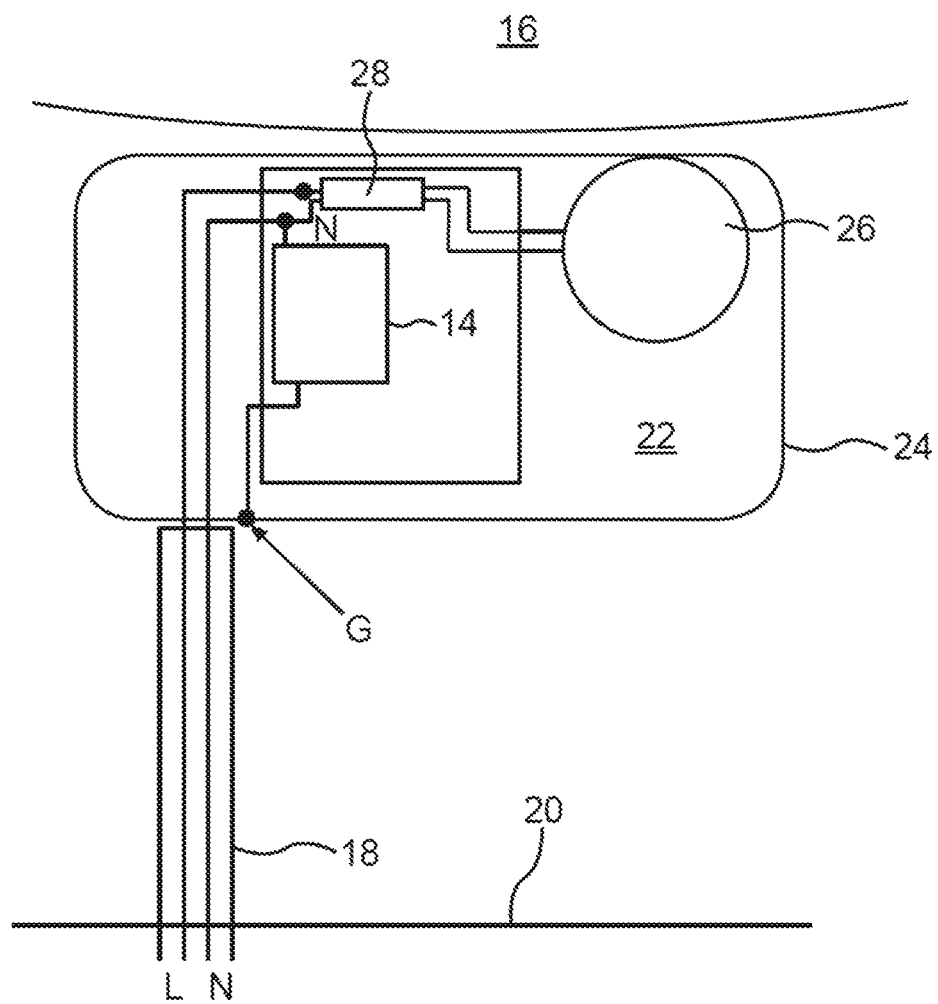
FIG. 3 shows an embodiment of a luminaire according to various embodiments having an overvoltage protection apparatus according to various embodiments.

FIG. 3 shows a schematic illustration of a street lamp 16 having a pole foot 18 which is introduced into the ground 20. A luminaire 22 having a metal luminaire housing 24 is mounted on the pole foot 18. The luminaire 22 includes at least one LED module 26 which is controlled via a driver 28. The driver 28 is coupled to an L line and to an N line which are both routed into the luminaire 22 via the pole foot 18. An overvoltage protection apparatus 14 according to various embodiments is coupled between the N line and a point G of the metal luminaire housing 24.

A simulation of the embodiment illustrated in FIG. 2 provided the results illustrated in the following table, in which case the voltage of the housing G with respect to the neutrality conductor connection N of the ECG (electronic control gear=LED driver) for different ground resistances $R_E$ is stated. The overvoltage at the remote ground potential (EP) with respect to N was assumed to be 10 kV.

| | With overvoltage protection apparatus | | Without overvoltage protection apparatus |
|---|---|---|---|
| $R_E$ | Voltage | Voltage inside the first 3 μs | Voltage |
| 25 Ω | 5.5 kV | 4 kV | 11 kV |
| 50 Ω | 4.5 kV | 2.5 kV | 11 kV |
| 100 Ω | 3 kV | 1.5 kV | 10 kV |
| 200 Ω | 2 kV | 1 kV | 10 kV |

The second table shows the voltage of the housing G with respect to the output of the ECG-internal input filter, the input of which is connected to N, with the same ground resistances $R_E$ as in table 1.

| | With overvoltage protection apparatus | | Without overvoltage protection apparatus |
|---|---|---|---|
| $R_E$ | Voltage | Voltage inside the first 3 μs | Voltage |
| 25 Ω | 6 kV | 5 kV | 14 kV |
| 50 Ω | 4.5 kV | 3 kV | 13 kV |
| 100 Ω | 3 kV | 2 kV | 12 kV |
| 200 Ω | 2 kV | 1 kV | 10 kV |

As is clearly shown from the simulation results, the voltage pulse was able to be reduced to less than 50%. The voltage pulse was reduced to less than 35% within the first three μs.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An overvoltage protection apparatus, comprising:
a first connection for coupling to an N line; and
at least one voltage-limiting element which is designed to block the current through the voltage-limiting element up to a predefinable threshold value of the voltage dropped across the voltage-limiting element and to conduct the current above this threshold value;
a second connection for coupling to a metal housing of an electrical apparatus;
at least one capacitor; and
at least one first non-reactive resistor;
wherein the at least one capacitor, the at least one first non-reactive resistor and the at least one voltage-limiting element are connected in series between the first connection and the second connection.

2. The overvoltage protection apparatus of claim 1, wherein the at least one capacitor comprises a series circuit comprising two, three or four capacitors.

3. The overvoltage protection apparatus of claim 1, wherein the capacitor is in the form of a Y capacitor.

4. The overvoltage protection apparatus of claim 1, wherein the capacitor is a radio interference suppression capacitor of class Y1 or Y2.

5. The overvoltage protection apparatus of claim 1, wherein the capacitor has a total capacitance of 0.010 μF to 10 μF.

6. The overvoltage protection apparatus of claim 1, wherein the or each capacitor has a pulse dielectric strength of between 2 kV and 10 kV.

7. The overvoltage protection apparatus of claim 1, wherein the overvoltage protection apparatus further comprises a second non-reactive resistor which is connected in parallel with the at least one capacitor.

8. The overvoltage protection apparatus of claim 7, wherein the second non-reactive resistor is between 0.3 MΩ and 10 MΩ.

9. The overvoltage protection apparatus of claim 1, wherein the first non-reactive resistor is between 5Ω and 40Ω.

10. The overvoltage protection apparatus of claim 1, wherein the at least one voltage-limiting element comprises an air spark gap.

11. The overvoltage protection apparatus of claim 10, wherein the field strength of the air spark gap is dimensioned in such a manner that the voltage at the capacitor is limited to 5 kV to 15 kV.

12. The overvoltage protection apparatus of claim 10, wherein the air gap of the air spark gap is 3 mm to 6 mm.

13. The overvoltage protection apparatus of claim 1, wherein the voltage-limiting element is designed to limit the voltage to a value of between 500 V and 6 kV.

14. The overvoltage protection apparatus of claim 1, wherein the at least one capacitor, the at least one first non-reactive resistor, and the at least one voltage-limiting element are connected in series, in any order, between the first connection and the second connection, and wherein no other elements are connected in series between the at least one capacitor, the at least one first non-reactive resistor or the at least one voltage-limiting element.

15. The overvoltage protection apparatus of claim 14, wherein the overvoltage protection apparatus is next connected in series to a resistor, and where the resistor is next connected in series to a remote ground potential.

16. The overvoltage protection apparatus of claim 1, wherein the second connection for coupling to the metal housing of the electrical apparatus is connected, in series, to the at least one first non-reactive resistor, which is connected, in series, to the first connection for coupling to the N line; wherein no other elements are connected in series between the second connection for coupling to the metal housing of the electrical apparatus and the at least one first non-reactive resistor, and wherein no other elements are connected in series between the at least one first non-reactive resistor and the first connection for coupling to the N line.

17. A luminaire, comprising:
  a metal luminaire housing;
  a first luminaire connection for coupling to an N line;
  a second luminaire connection for coupling to an L line; and
  an overvoltage protection apparatus, comprising:
    a first connection for coupling to an N line; and
    at least one voltage-limiting element which is designed to block the current through the voltage-limiting element up to a predefinable threshold value of the voltage dropped across the voltage-limiting element and to conduct the current above this threshold value;
    a second connection for coupling to a metal housing of an electrical apparatus;
    at least one capacitor; and
    at least one first non-reactive resistor;
    wherein the at least one capacitor, the at least one first non-reactive resistor and the at least one voltage-limiting element are connected in series between the first connection and the second connection;
  wherein the first connection of the overvoltage protection apparatus is coupled to the first luminaire connection; and
  wherein the second connection of the overvoltage protection apparatus is coupled to the metal luminaire housing.

18. The luminaire of claim 17, wherein the luminaire comprises at least one light emitting diode as luminous means.

19. The luminaire of claim 17, comprising an overvoltage routing connection from the second connection for coupling to a metal housing of an electrical apparatus, through the metal housing, and into the N line.

20. The luminaire of claim 19, wherein the luminaire comprises no Protective Earth terminal.

* * * * *

UNITED STATES PATENT AND TRADEMARK OFFICE
CERTIFICATE OF CORRECTION

PATENT NO.        : 9,705,316 B2
APPLICATION NO.   : 14/989819
DATED             : July 11, 2017
INVENTOR(S)       : Joachim Muehlschlegel It is certified that error appears in the above-identified patent and that said Letters Patent is hereby corrected as shown below:

In the Specification

Column 7, Line 6: Please delete "2 MQ" and write -- 2 MΩ -- in place thereof.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*